United States Patent [19]
Taniguchi et al.

[11] Patent Number: 5,235,688
[45] Date of Patent: Aug. 10, 1993

[54] MEMORY ACCESS CONTROL UNIT FOR ALLOWING MAXIMUM THROUGHPUT OF AN I/O PROCESSOR AND AN I/O REQUEST BUFFER FULL STATE

[75] Inventors: Toshihisa Taniguchi; Tsutomu Sumimoto, both of Hadano, Japan

[73] Assignee: Hitachi, Ltd., Tokyo, Japan

[21] Appl. No.: 532,446

[22] Filed: Jun. 4, 1990

[30] Foreign Application Priority Data

Jun. 19, 1989 [JP] Japan .................. 1-156169

[51] Int. Cl.⁵ .................................. G06F 12/00
[52] U.S. Cl. ..................... 395/425; 364/DIG. 1; 364/243.41; 364/931.46
[58] Field of Search .......... 395/425 MS, 400; 364/200 MS File, 900 MS File

[56] References Cited

U.S. PATENT DOCUMENTS

| | | | |
|---|---|---|---|
| 3,648,252 | 3/1972 | Thron et al. | 395/650 |
| 3,954,948 | 9/1990 | Hira et al. | 395/650 |
| 4,152,761 | 5/1979 | Louie | 395/650 |
| 4,646,233 | 2/1987 | Weatherford et al. | 395/425 |
| 4,648,065 | 3/1987 | Zenk et al. | 395/425 |
| 4,665,483 | 5/1987 | Ciacci et al. | 395/325 |
| 4,835,672 | 5/1989 | Zenk et al. | 395/425 |
| 4,873,629 | 10/1989 | Harris et al. | 395/375 |
| 4,942,518 | 7/1990 | Weatherford et al. | 395/800 |
| 5,140,682 | 8/1992 | Okura et al. | 395/425 |

FOREIGN PATENT DOCUMENTS 57-205882  12/1982  Japan .

Primary Examiner—Joseph L. Dixon
Assistant Examiner—Frank J. Asta
Attorney, Agent, or Firm—Fay, Sharpe, Beall, Fagan, Minnich & McKee

[57] ABSTRACT

When an IOP is transferring data at the maximal throughput because of the fact that the input-output processor (IOP) has issued a next request under a state when the request buffers are full of requests from the IOP at least a part of the requests from the instruction processor (IP) is inhibited. Inhibition of the requests from the IP is released when the pitch of the requests from the IOP reaches a predetermined period or more. When the IOP is transferring data at the maximal throughput in a system having a cache memory, access to the main memory by the IP is inhibited in case requested data does not exist in the cache memory.

13 Claims, 6 Drawing Sheets

MEMORY ACCESS CONTROL UNIT FOR ALLOWING MAXIMUM THROUGHPUT OF AN I/O PROCESSOR AND AN I/O REQUEST BUFFER FULL STATE

BACKGROUND OF THE INVENTION

The present invention relates to a memory access control unit and, more particularly, to a memory access control unit which is capable of limiting processing of an instruction processor (IP) request thereby preventing generation of channel overrun of an input-output processor (IOP) when the IOP is transferring data at maximum throughput.

As to a conventional memory access control unit, the control of processing of a request from an IOP is utilized in some units as a countermeasure to channel overrun as disclosed in JP-A-57-205882.

In the case of this control unit, when required data does not exist on a buffer memory, a fetching operation by the IOP under a specific condition from an input-output channel for instance, required data is loaded in the buffer memory from a main memory. Otherwise, the buffer memory is not accessed, but the main memory is accessed directly.

In above-described prior art, however, no consideration is given to the handling of a request of the IP when the IOP is transferring data at the maximal, or maximum, throughput. In a multiprocessor system, request processing capacity of a system control unit (SCU) is increased. Accordingly, the request from the IP is also received when the IOP is transferring the data at the maximal throughput. As a result, throughput is lowered. Particularly in a system having a cache memory in the SCU, when data that does not exist in the cache memory is accessed by the request from the IP, a long cycle is occupied for processing that request, which causes lowering of the throughput of the IOP.

SUMMARY OF THE INVENTION

It is an object of the present invention to provide a memory access control unit which is capable of preventing channel overrun from occurring.

It is another object of the present invention to provide a memory access control unit which is capable of suppressing processing of a request from an IP when it is regarded an the IOP is under the maximal throughput state, thereby preventing the throughput from lowering.

It is still another object of the present invention to provide a memory access control unit which is capable of control in accordance with the number of channels in use of the system.

It is yet another object of the present invention to provide a memory access control unit which is capable of checking access of the IP to a cache memory in which data that is requested by the IP does not exist, thereby preventing the throughput from lowering even in a system having the cache memory.

Typical embodiments of the present application will be explained briefly, as follows.

That is, a memory access control unit according to the present invention may be provided with, in a data processing system in which at least one IP and at least one IOP have a main memory in common and a plurality of request buffers for holding the request from the IOP are provided in a memory control portion, detection means for detecting that a predetermined quantity of requests are kept waiting in said request buffers, an inhibit means for inhibiting a part of or the whole main memory access of requests from the IP based on the result of such detection, and a means which detects that the time interval between requests from said IOP is longer than a set value and releases the inhibition of requests from said IP.

Further, according to the present invention, said detection means may detect a state in which a request control portion of said IOP has issued a next request, and that request is kept waiting under such a state that all of said request buffers are full of requests.

Furthermore, a memory access control unit of the present invention may be provided with a means which is able to set the time interval between requests of said IOP optionally in accordance with the system.

Also, a means which holds information detected by said detection means during the period while said IOP is transferring data at the maximal throughput may be provided.

Further, said inhibit means may be a means which inhibits the instruction processor request unconditionally.

Furthermore, said inhibit means may be one which processes the requests from the IP by dividing them into a group whose processing is inhibited and a group whose processing is accepted.

Moreover, another memory access control unit according to the present invention may be provided with a means in which at least one IP and at least one IOP have a main memory and a cache memory which stores a part of the data of said main memory in common and which detects that a predetermined quantity of requests are kept waiting in request buffers for holding the requests from the IOP, and a means which permits access to the cache memory only when request data exists in said cache memory among main memory access of the requests from the IP, and inhibits access to said main memory and has the requests wait at the entrance of the cache memory and give priority to requests from the IOP to be processed when said request data does not exist in said cache memory.

According to a memory access control unit of the present invention, it can be restricted so that the request of the IP does not exert a bad influence upon securing of channel throughput when the requests from the IOP are kept waiting in the request buffers. Therefore, it is possible to secure throughput and to prevent channel overrun from generating.

In addition, since time intervals between requests from the IOP can be monitored, it is possible to restrict the processing of the request from the IP to the time when restriction is really needed for the IOP, thus making it possible to execute processing of the IOP without being hindered by the request of the IP at the time of the maximal throughput of the IOP.

Furthermore, in the present invention, a monitored value of the time interval between the requests of the IOP may be set optionally in accordance with the system. Thus, the control according to the number of channels in use of the system is possible without exerting a bad influence upon the maximal throughput of the IOP.

Also, in the present invention, no access of the IP is made to a cache memory where data that is requested by the IP does not exist also in a system having the cache memory. Therefore, request processing is not performed being originated in the above, and the throughput is not lowered.

DESCRIPTION OF THE PREFERRED EMBODIMENTS

Figure 2:
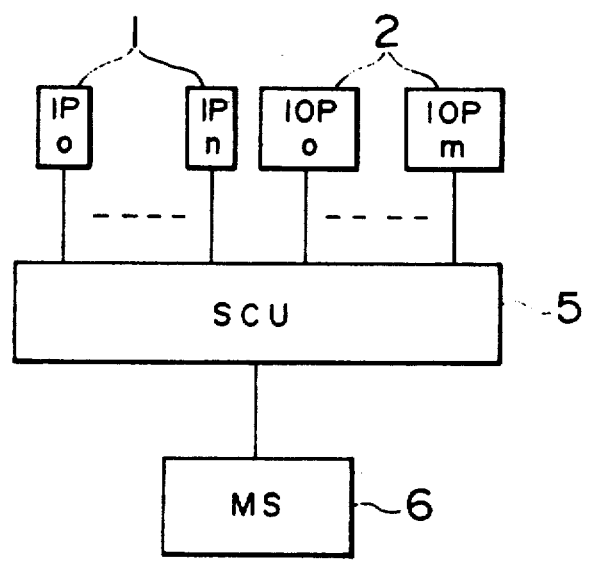
FIG. 2 is a diagram showing an example of system composition according to the present invention.
Figure 3:
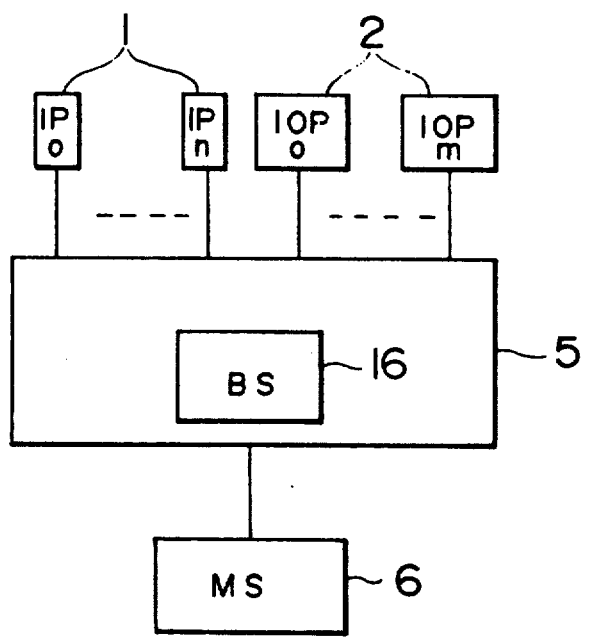
FIG. 3 is a diagram showing another system composition according to the present invention.

As a system in which the present invention is applicable, a system in which a plurality of instruction processors (IPs) and input-output processors (IOPs) are connected to a memory composition (FIG. 2) which does not include a cache memory in SCU but includes a main memory only or a memory composition (FIG. 3) which has a main memory and a cache memory in SCU in common may be illustrated. However, a system having in common a cache memory in which one set each of IP and IOP have data that is a part of the content of the main memory copied from the main memory will be explained as an example for the sake of simple explanation.

Figure 1:
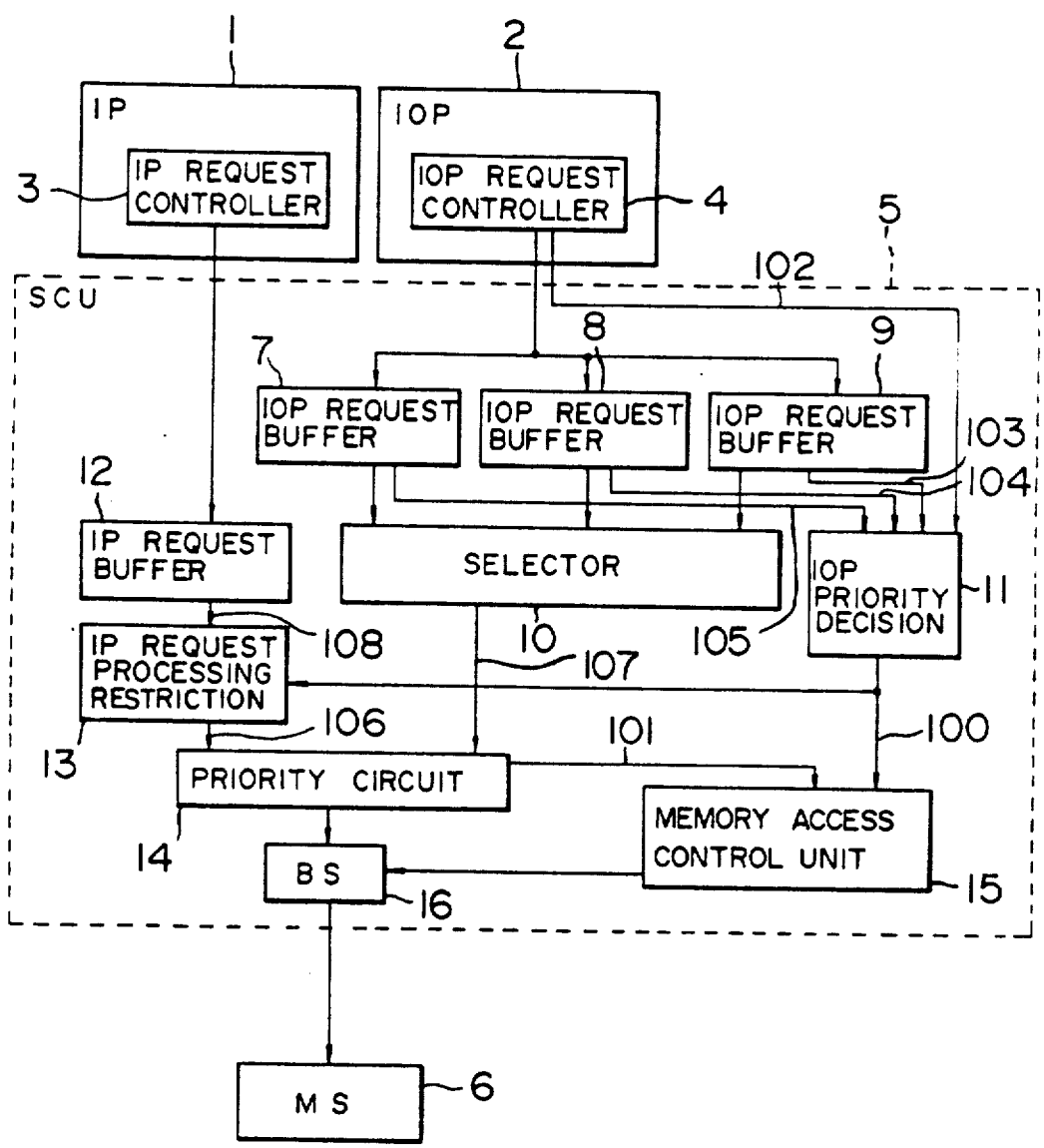
FIG. 1 is a block diagram showing an example of a system to which a memory access control system according to an embodiment of the present invention is applicable.

FIG. 1 shows such a system.

The system shown in FIG. 1 is provided with one set of IP 1 and one set of IOP 2 as described above. The IP 1 and the IOP 2 have an IP request control portion 3 and an IOP request control portion 4, respectively.

Also, the system shown in FIG. 1 has a system control unit (SCU) 5 and a main memory (MS) 6.

Said SCU 5 is provided with three IOP request buffers 7, 8 and 9 for receiving a request from the IOP 2, and any one of the outputs of these IOP request buffers 7, 8 and 9 is selected by a selector 10.

Further, the IOP request buffers 7, 8 and 9 are connected to a means for deciding, or determining priority processing of the IOP request, that is, an IOP priority processing decision circuit 11. Said IOP request controller 4 is also connected to this IOP priority processing decision circuit 11.

On the other hand, an IP request buffer 12 connected to said IP request controller 3 for receiving a request from the IP 1 is provided in the SCU 5. This request buffer 12 is connected to an IP request processing restriction circuit 13 (request processing inhibit means).

This IP request processing restriction circuit 13 functions as a means for restricting or inhibiting processing of the request from the IP 1 (IP request) in accordance with an output signal 100 of said IOP priority processing decision circuit 11.

Further, said IP request processing restriction circuit 13 is connected to a priority circuit 14 of the SCU 5, and said priority circuit 14 is connected to a memory access control portion 15 and a cache memory (BS) 16. The priority circuit 14 is composed such that the IOP request has priority always when the IP request and the IOP request concur with each other.

Said IOP priority processing decision circuit 11 renders the output signal 100 from said circuit 11 to "1" when all three IOP request buffers 7, 8 and 9 are full of requests, that is, all of signals 103, 104 and 105 from respective buffers 7, 8 and 9 are at "1", and further, the IOP request control portion 4 issues a next request (in other words, a state that a signal 102 from the IOP request control portion 4 is at "1"), thus restricting processing of the IP requests. The foregoing is performed by sending the output signal 100 to the IP request processing restriction circuit 13 and the memory access control portion 15 and executing priority processing of the IOP request in respective control portions.

Here, the IOP priority processing decision circuit 11 will be described in detail based on FIG. 4. In the present embodiment, the stage indicating that all of the IOP request buffers 7, 8 and 9 are full and a next request is kept waiting in the IOP 2 is regarded as a state in which the IOP 2 requests the maximal throughput and is issuing a memory access request.

Usually, request processing of the IOP 2 is designed so as to absorb memory access overhead with prepared buffers even when the maximal throughput is output.

However, in a system in which the memory throughput of the SCU 5 is not sufficiently large with respect to the data transfer request maximal throughput of the IOP 2, if the request of the IP 1 is processed by the SCU 5 when the IOP requests the maximal throughput, the memory access overhead cannot be absorbed by the IOP request buffers 7, 8 and 9 of the IOP 2. The IOP request control portion 4 of the IOP 2 cannot deliver the next request to the SCU 5 side and is kept waiting, and all of signals 102 to 105 become "1" and an output signal 402 of an AND gate 401 also becomes "1", thus a flip-flop (FF) 400 for IOP priority processing indication is set at "1". In the present invention, such a state is regarded as the state in which the IOP is under the maximal throughput state, but it is needless to say that the state when all of the signals 103 through 105 except 102 have become "1" may be considered as the maximal throughput state.

When the request of the IP 1 is processed by the SCU 5 under this state, a danger exists that the IOP 2 cannot secure the maximal throughput, but channel overrun is produced. Accordingly, it is required to inhibit or restrict processing of the request from the IP 1.

However, when the IOP is no longer under the maximal throughput state, inhibition or restriction of processing of the request from the IP 1 has to be released. This is performed by resetting the FF 400 shown in FIG. 4. Here, the reset condition detecting logic of said FF 400 will be explained. That is, in FIG. 4, the portion marked 410 is the reset condition detection circuit. The IOP request receiving time interval (number of machine cycles: P) at the output time of the maximal throughput of the IOP 2 is set to a register 410a of the reset condition detection circuit 410 at the time of initialization in advance. The time intervals of reception of the requests from the IOP 2 at the request buffers 7, 8 and 9 are counted by using a system clock and the like at the time when the FF 400 is set at "1" and thereafter, and the FF 400 is reset if said count value > P.

Figure 4:
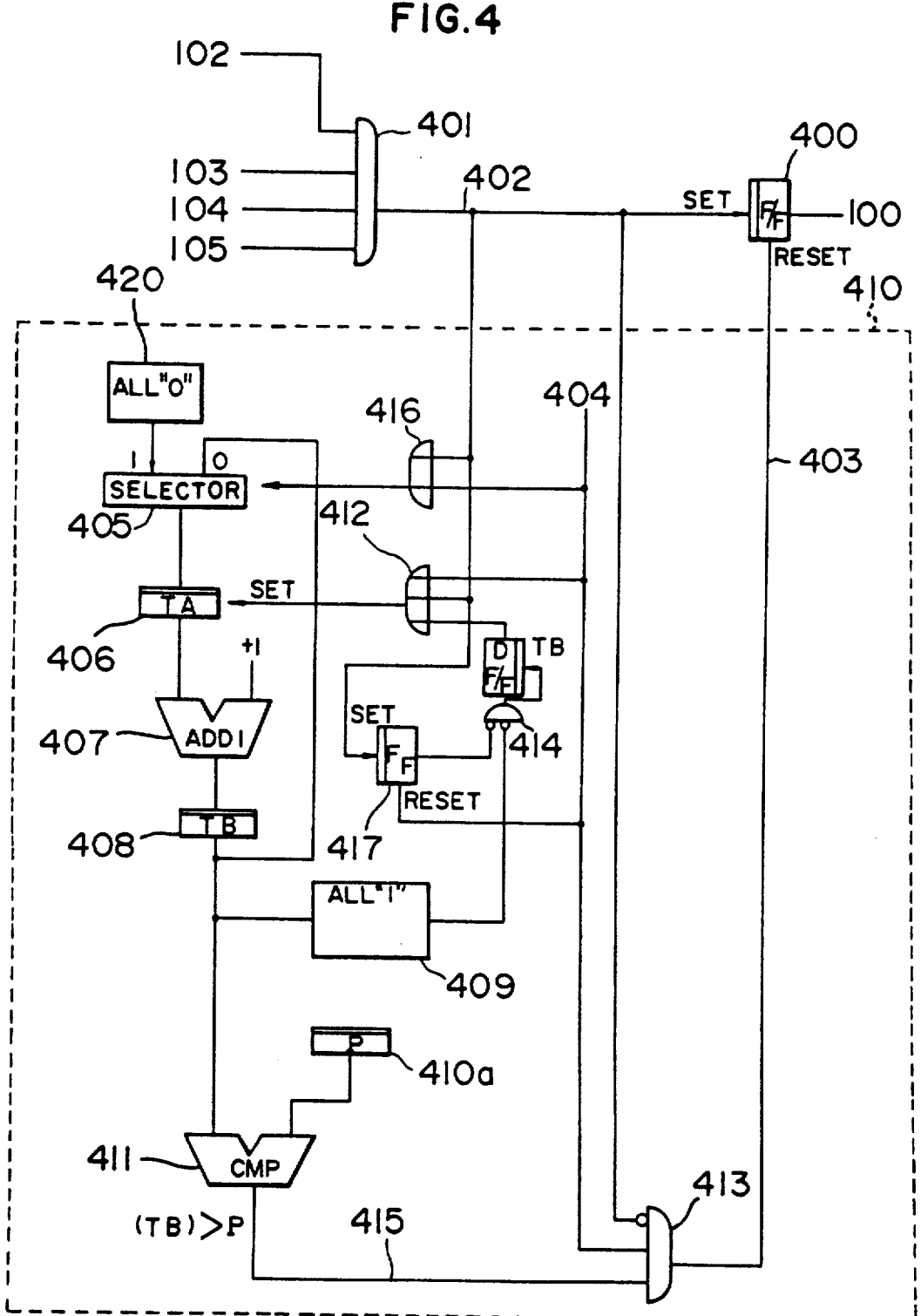
FIG. 4 is a block diagram showing an IOP priority processing decision circuit in the present invention.

Besides, a signal 404 shown in FIG. 4 is a pulse signal showing that the request of the IOP 2 has been received by the request buffer 7, 8 or 9. 405 denotes a selector, and ALL "0" is selected from a circuit 420 and set to a register 406 when the signal 404 is at "1". 407 denotes a plus 1 circuit, and the output result thereof is set to a register 408 unconditionally. 409 denotes a circuit which decides whether the content of the register 408 is ALL "1" or not, and the registers 406 and 408 are counted up every cycle until ALL "1" is reached.

When the signal 404 becomes "1" with a next request from the IOP, the contents of registers 408 and 410a are compared with each other in a comparison circuit 411. When content of 408 > content of 410a, a signal 415 becomes "1", a logical product is delivered by the signal 404 and an AND gate 413, and, when a signal 402 representing the set condition of the FF 400 is not at "1", the FF 400 is reset by a signal 403.

Furthermore, marks 412 and 416 shown in FIG. 4 denote OR gates, and 414 denotes an AND gate. When the signal 402 becomes "1", the register 406 is cleared to show "0" through the gates 416 and 412. On the other hand, since a D flip-flop (D-FF) 417 is set, the AND gate 414 is inhibited, and count-up of the registers 406 through 407 are continued until the pulse signal 404 is generated and the FF 417 is reset.

Figure 5:
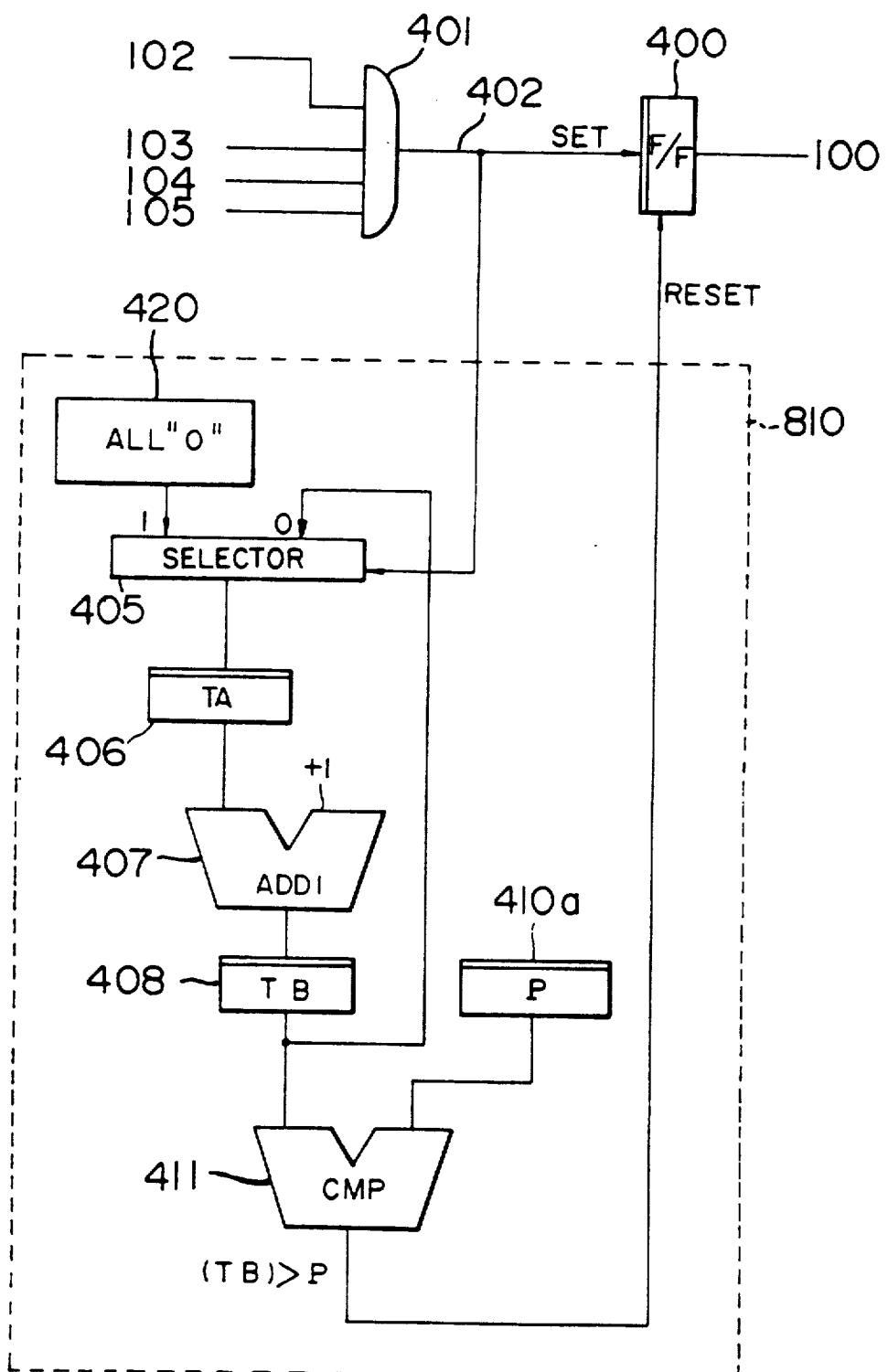
FIG. 5 is a block diagram showing another embodiment of an IOP priority processing decision circuit in the present invention.

FIG. 5 shows another embodiment of the reset condition detection circuit. In FIG. 5, a reset condition detection circuit 810 is a simplified circuit of that shown in FIG. 4. That is, the reset condition detection circuit consists of a selector 405, a register 406, a plus 1 circuit 407, a register 408, a register 410a, a comparison circuit 411 and an ALL "0" circuit 420. Here, those reference numerals that are the same as shown in FIG. 4 represent the same or equivalent parts. Now, the output of the AND gate 401 becomes "1" and sets the FF 400. Simultaneously, the data of ALL "0" in the circuit 420 are loaded to the register 406 through the selector 405. Since the selector 405 selects the register 408 immediately after selecting the ALL "0" circuit 420, count-up is started using the plus 1 circuit 407 and the register 408. When it is shown by the comparison circuit 411 that the content of the register 408 is larger than the value of the register 410a, the FF 400 is reset.

Next, embodiments of said IP request processing restriction circuit 13 (IP request processing inhibit means), that is, a circuit which receives the output signal 100 of the IOP priority processing indication FF 400 and restricts or inhibits processing of the request from the IP, will be explained with reference to FIG. 6 and FIG. 7.

Figure 6:
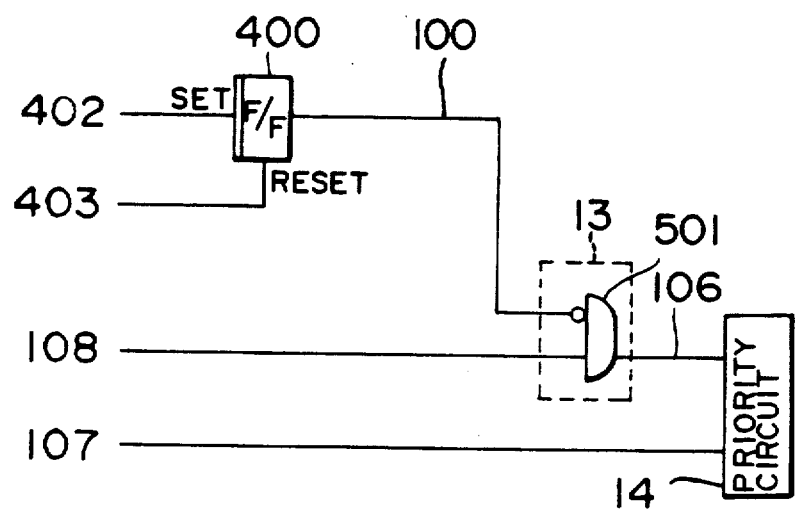
FIG. 6 a diagram showing an example of a processing inhibit means of the request from the IP in the present invention.

FIG. 6 shows an example of inhibiting the request from the IP 1 unconditionally. In this case, the IP request processing restriction circuit 13 has an AND gate 501, and the signal 100 from the FF 400 and the signal 108 from the IP request buffer 12 are input to this AND gate 501.

The logical product signal with the signals 100 and 108 are sent out to the priority circuit 14 as a signal 106. Further, a signal 107 from the selector 10 is also input to the priority circuit 14.

Figure 7:
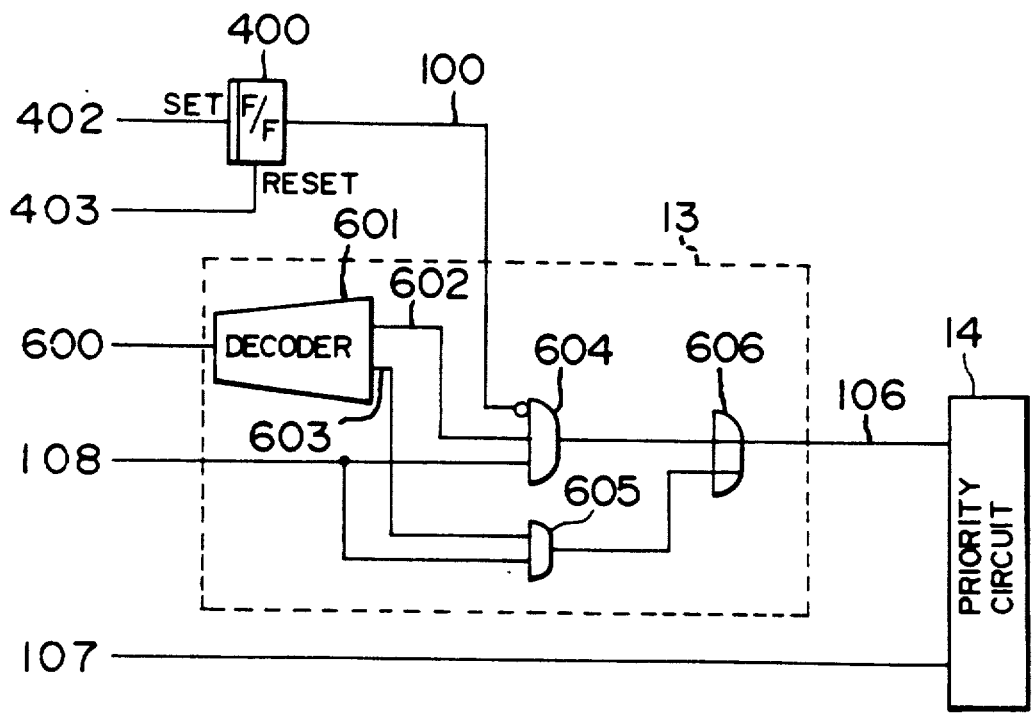
FIG. 7 is a diagram showing another example of a processing inhibit means of the request from the IP in the present invention.

FIG. 7 shows an example in which processing is performed by dividing the IP requests into two groups, the request 602 of the group suppressing the processing and the request 603 of the group receiving the processing.

The IP request processing restriction circuit 13 includes a request decoder 601 into which a signal 600 is input, AND gates 604 and 605 and an OR gate 606.

The reference for grouping the requests 602 and 603 is such that a request of short cycle processing which does not generate lowering of the maximal throughput even if it is put in during request processing of the IOP 2 is named 603 and those requests other than the above are named 602.

Next, receiving restriction and inhibit processing of the IP request in a system having a cache memory according to the present invention will be explained with reference to FIG. 8.

In the example explained with reference to FIG. 7, it was stated that processing to receive the IP request which can be processed in a short cycle is executed even when the FF 400 is at "1". In a system having a cache memory (BS) 16, however, the SCU 5 is occupied for a long time with block transfer from the main memory 6 in case there is no request data in the cache memory 16 (hereinafter referred to as Not in BS) even for a short cycle request. Accordingly, it is required that the IP request received and processed while the FF 400 is at "1" is executed with respect to in BS only, and control to keep waiting at the request buffer 12 of the IP 1 is performed for the case of Not in BS.

Figure 8:
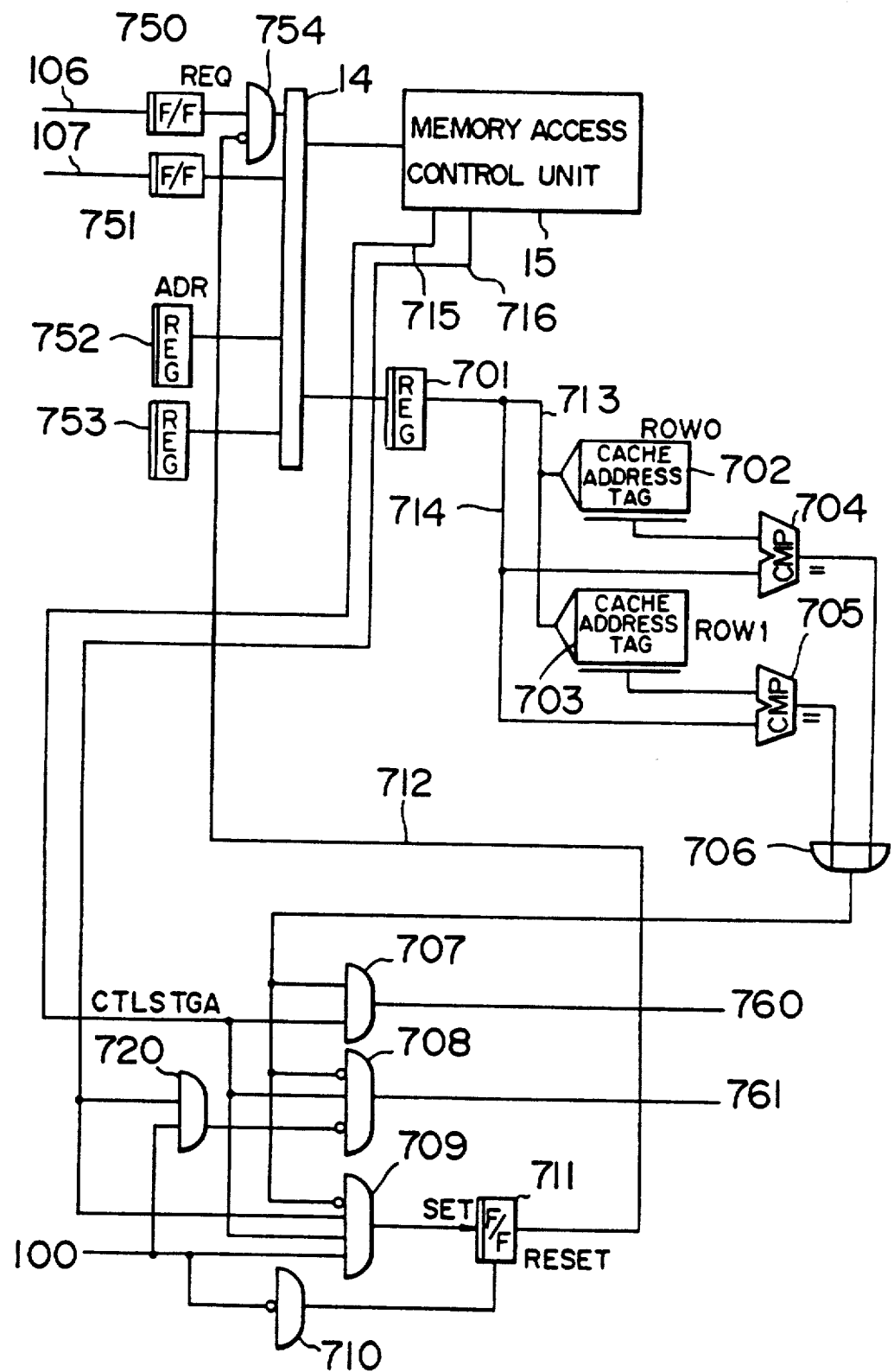
FIG. 8 is a block diagram showing an example of a reception limiting means of the request from the IP in a system having a cache memory in the present invention.

In the example shown in FIG. 8, the cache memory has a two-ROW composition. 750 denotes an IP request, 751 denotes an IOP request, 752 denotes an IP request address register and 753 denotes an IOP request address register. The request address which has passed through the priority circuit 14 of the SCU 5 is set to an address register 701. The output of the address register 701 is divided into a column address 713 and an entry address 714 of the cache memory. 702 denotes a ROW 0 cache address tag portion, and 703 denotes a ROW 1 cache address tag portion.

The output of the cache address tag portion is compared with the entry address portion 714 by comparison circuits 704 and 705, and "1" is output when they are in accord with each other. When the accessed area exists in the cache memory, either one of the outputs of 704 and 705 becomes "1". Therefore, in case of in BS, the output of an OR gate 706 becomes "1". On the other hand, a control stage signal 715 and a signal 716 which shows that the request in execution is an IP request are output from a memory access control portion 15.

If the IP request is in BS, processing start (760) of in BS is made. When the logical product 720 of outputs of the line 716 and the line 100 is at "1", Not in BS processing start 761 is inhibited in the case of Not in BS. Instead, a FF 711 is set, and the IP request is inhibited by an AND gate 754 to advance to the priority circuit 14 of the SCU 5. In this case, when the FF 400 is at "1", control is made so that renewal of a stack of the IP request 751 is kept waiting until it is decided whether the request data exist in the cache memory 16 or not.

Besides, in an example shown in FIG. 8, marks 707, 708, 709, 720 and 754 represent AND gates. A mark 710 denotes an inverter.

According to the present embodiment, since the request of the IP "1" may be inhibited while the IOP 2 is transferring data to the maximal throughput, it is possible to prevent the throughput from lowering.

Further, by designating the memory access interval at the time of maximal throughput in advance, it is possible to restrict IP request processing only when it is found really needed by comparing with actual memory access interval.

The circuit shown in FIG. 8 may be used alone, and effects are also obtainable by combining it with any of circuits shown in FIGS. 4, 5, 6 and 7.

While the present invention made by the present inventor has been described above in a concrete manner based on embodiments thereby, it is a matter of course that the present invention is not limited to above-described embodiments, but that various changes may be made within the scope of the present invention without deviating from the gist thereof.

Among those inventions that are disclosed in the present application, effects obtainable by typical inventions are described briefly, as follows.

(1) When a request from the IOP is kept waiting in the request buffers, a request from the IP may be restricted so that no bad influence is exerted upon securing of the channel throughput. Accordingly, it is possible to prevent channel overrun from generating.

(2) Since it is possible to monitor the time interval between the requests from the IOP, processing of the request from the IP is restricted only to the time when restriction is really needed, and processing of the IOP will never be hindered by the IP at the time of maximal throughput of the IOP.

(3) Effective utilization of the system may be planned without deteriorating total performance of the system by above-described items (1) and (2).

(4) Due to the fact that the time interval between the requests of the IOP may be set optionally in accordance with the system, memory access control according to the number of channels in use of the system becomes possible without exerting a bad influence upon the maximal throughput.

(5) In a system having a cache memory, a request from an IP is processed even in the I/O request buffer full state only in a case where requested data exists in the cache memory. In other words, since the request from the IP is not processed when no requested data exists in the cache memory, the throughput cannot be lowered by the processing by the IP.

We claim:
1. An access control unit, comprising:
a main memory for storing data;
at least one instruction processor which issues at least one first request for access to said main memory;
at least one input/output processor which issues a plurality of second requests for access to said main memory;
request buffer connected to said at least one input/output processor, for holding the plurality of second requests issued from said at least one input/output processor;
means, connected to said request buffers, for detecting a state of said request buffers to generate an output signal when said input/output processor is under a maximal throughput state; and
means connected to said detecting means, for inhibiting the at least one first request issued from said at least one instruction processor in response to the output signal of said detecting means.

2. The access control unit according to claim 1, further comprising means, connected to said detecting means and said inhibiting means, for releasing inhibition by said inhibiting means when a time interval between second requests received by said request buffers is longer than a predetermined time.

3. The access control unit according to claim 1, further comprising means, connected to said detecting means and said inhibiting means, for releasing inhibition by said inhibiting means after a lapse of a predetermined time period measured from generation by said detecting means of said output signal.

4. The access control unit according to claim 1, further comprising:
a cache memory, connected to said main memory, for storing a part of the data stored in said main memory;
another detecting means, connected to said cache memory and said inhibiting means, for detecting whether the data in said main memory to be accessed by the at least one first request of said at least one instruction processor exists in said cache memory; and
another inhibiting means, connected to said another detecting means, for inhibiting access to main memory by said at least one instruction processor when the data in said main memory to be accessed by the at least one first request of said at least one instruction processor does not exist in said cache memory.

5. The access control unit according to claim 4, further comprising means, connected to said request buffers and said inhibiting means, for releasing inhibit by said inhibiting means when a time interval between second requests received by said request buffers is longer than a predetermined value.

6. The access control unit according to claim 4, further comprising means, connected to said detecting means and said inhibiting means, for releasing inhibition by said inhibiting means after a lapse of a predetermined time period measured from generation by said detecting means of said output signal.

7. The access control unit according to claim 1, wherein said detecting means includes a circuit for generating said output signal when all of said request buffers are in a full state.

8. The access control unit according to claim 1, wherein said detecting means includes a circuit for generating said output signal when said at least one input/output processor issues a next request under such a condition that all of said request buffers are in a full state.

9. The access control unit according to claim 2, further comprising register means which holds a value corresponding to said predetermined time variably.

10. The access control unit according to claim 3, further comprising register means which holds a value corresponding to said predetermined time variably.

11. The access control unit according to claim 2, wherein said inhibiting means includes a flip-flop means which is set in response to said output signal of said detecting means; and
said means for releasing includes:
clock means for starting a clock count when a next request from said at least one input/output processor is received by one of said request buffers after the inhibition by said inhibiting means;
register means which holds a value corresponding to said predetermined time variably;
comparison means for comparing the clock count counted by said clock means with the value held by said register means; and means for resetting said flip-flop means when a result of comparison by said comparison means shows that said clock count is bigger than said held value.

12. The access control unit according to claim 3, wherein said inhibiting means includes flip-flop means which is set in response to said output signal of said detecting means; and said means for releasing includes:
clock means for starting a clock count when said detecting means generates said output signal;
register means which holds a value corresponding to said predetermined time variably; and
comparison means for comparing the clock count counted by said clock means with the value held in said register means, for resetting said flip-flop means when a result of comparison shows that said clock count is bigger than said held value.

13. An access control unit, comprising:
a main memory for storing data;
at least one instruction processor which issues a first request for access to said main memory;
at least one input-output processor which issues a second request for access to said main memory;
a cache memory connected to said main memory, for storing a part of the data stored in said main memory;
means, connected to said cache memory, for detecting whether data in said main memory to be accessed by a first request of said at least one instruction processor exists in said cache memory; and
inhibit means connected to said detecting means, for inhibiting access to said main memory by said at least one instruction processor when the data of said main memory to be accessed by the first request of said at least one instruction processor does not exist in said cache memory and said at least one input-output processor is under a maximum throughput state.

* * * * *

UNITED STATES PATENT AND TRADEMARK OFFICE
CERTIFICATE OF CORRECTION

PATENT NO. : 5,235,688

DATED : August 10, 1993

INVENTOR(S) : Toshihisa Taniguchi, et al.

It is certified that error appears in the above-identified patent and that said Letters Patent is hereby corrected as shown below:

Claim 4, column 8, line 21, after "to" insert --said--.

Signed and Sealed this

Third Day of May, 1994

Attest:

BRUCE LEHMAN

*Attesting Officer*   *Commissioner of Patents and Trademarks*